United States Patent [19]

Samejima et al.

[11] Patent Number: 5,199,521

[45] Date of Patent: Apr. 6, 1993

[54] LAWN MOWER HAVING PASSAGES FOR ENGINE COOLING AIR

[75] Inventors: Kazuo Samejima; Shigeru Morita; Yoshihiro Kawahara; Hideya Umemoto; Terutaka Takei; Yoshikazu Togoshi; Akiyoshi Takemoto, all of Osaka, Japan

[73] Assignee: Kubota Corporation, Osaka, Japan

[21] Appl. No.: 689,197

[22] Filed: Apr. 22, 1991

[30] Foreign Application Priority Data

Jul. 18, 1990 [JP] Japan .................................. 2-191551
Dec. 12, 1990 [JP] Japan ............................. 2-400388[U]

[51] Int. Cl.$^5$ ............................................ B60K 11/04
[52] U.S. Cl. .................................. 180/68.1; 180/68.4; 56/6
[58] Field of Search .................... 180/68.1, 68.4, 68.3, 180/69.21, 69.2, 291; 56/6, 7

[56] References Cited

U.S. PATENT DOCUMENTS

| | | | |
|---|---|---|---|
| 3,516,233 | 6/1970 | Johnson et al. | 56/6 |
| 3,788,416 | 1/1974 | Sorenson et al. | 180/68.1 |
| 4,304,314 | 12/1981 | Sakaguchi et al. | 180/68.4 |
| 4,573,544 | 3/1986 | Hoch et al. | 180/68.1 |
| 4,738,327 | 4/1988 | Takei | 180/68.4 |
| 4,750,319 | 6/1988 | Aldred | 56/7 |
| 4,771,844 | 9/1988 | Bassett | 180/68.1 |
| 4,866,917 | 9/1989 | Phillips et al. | 56/6 |
| 4,891,940 | 1/1990 | Tamba et al. | 180/68.1 |
| 5,042,604 | 8/1991 | Tone et al. | 180/68.4 |

Primary Examiner—David M. Mitchell
Attorney, Agent, or Firm—Webb, Burden, Ziesenheim & Webb

[57] ABSTRACT

A lawn mower having a driver's section and a grass cutting unit forwardly of a vehicle body; an engine mounted between front and rear wheels; and a pair of main frames extending longitudinally of the vehicle body, each of the main frames including a front frame member, and a rear frame member connected to the front frame member and disposed at a lower level than the front frame member. The engine is mounted below the main frames between the front and rear wheels, and has a radiator disposed rearwardly of the engine and having an upper portion projecting upwardly of the rear frame members. The engine is surrounded by a first cover assembly including side covers depending respectively from the main frames, lower covers connecting the respective side covers to lower positions of the engine, and a front cover for closing an area forwardly of the engine. The first cover assembly defines first ambient air intake openings. A second cover is disposed rearwardly of the driver's section for covering the upper portion of the radiator. The second cover defines a second ambient air intake opening in a forward portion thereof. Cooling air flows produced by a fan disposed adjacent the radiator are drawn through the first and second ambient air intake openings, at least a large part of the cooling air flows being exhausted rearwardly through the radiator.

10 Claims, 4 Drawing Sheets

LAWN MOWER HAVING PASSAGES FOR ENGINE COOLING AIR

BACKGROUND OF THE INVENTION

1. Field of the Invention

The present invention relates to a lawn mower having a low center of gravity with a grass cutting unit connected to a front end thereof and an engine disposed in a low position, and more particularly to formation of passages for engine cooling air in such a lawn mower.

2. Description of the Related Art

With this type of lawn mower, the engine should desirably be disposed in a lowest possible position to lower the center of gravity of the mower for its steady running. For drawing adjacent air to cool the engine, dust protective netting must be applied to an air intake opening defined in an engine cover to minimize suction of grass clippings and dust produced by the grass cutting unit. The dust protective netting must have a small mesh because of its location adjacent ground surfaces where large quantities of dust are afloat. As a result, the netting tends to provide insufficient air intake areas and present considerable resistance to the influx of air. It is therefore difficult to cool the engine sufficiently.

SUMMARY OF THE INVENTION

An object of the present invention is to form cooling air passages that realize effective flows of cooling air optimally while allowing the engine to be disposed in a low position.

In order to achieve the above object, a lawn mower having a driver's section and a grass cutting unit forwardly of a vehicle body, and an engine mounted between front and rear wheels, according to the present invention, comprises;
 a radiator disposed rearwardly of the engine,
 first cover means for covering the engine, and defining first ambient air intake openings,
 second cover means disposed rearwardly of the driver's section for covering a region upwardly of the radiator, the second cover means defining a second ambient air intake opening in a forward portion thereof, and
 a fan disposed adjacent the radiator, cooling air flows produced by the fan being drawn through the first and second ambient air intake openings, at least a large part of the cooling air flows being exhausted rearwardly through the radiator.

A necessary quantity of air flow is secured by the additional air intake opening to enable ambient air intake through the front portion of the second cover as well as the first cover means covering the engine. Thus, the construction according to this invention realizes an improve air intake efficiency.

The second cover may take the form of a rear hood that enhances protection and appearance of a rear portion of the vehicle body.

The second ambient air intake opening disposed rearwardly of the driver's section is far above ground surfaces, and is in an environment relatively free from dust. The dust-free state is further promoted by a dust-shielding function of the driver's section with respect to the dust generated by the grass cutting unit. Consequently, where dust protective nets are provided for the ambient air intake openings, the net for the second ambient air intake opening may have a relatively large or coarse mesh for reduced intake resistance.

In a preferred embodiment of the invention, the vehicle body includes a pair of main frames extending longitudinally thereof, each of the main frames including a front frame member, and a rear frame member connected to the front frame member and disposed at a lower level than the front frame member. The engine is mounted below the front the front frames, with an upper portion of the radiator projecting above the rear frames. The second cover is mounted on the rear frames. This construction realizes a stable lawn mower.

Other objects and features of this invention will be understood from the following description made with reference to the accompanying drawings.

BRIEF DESCRIPTION OF THE DRAWINGS

The drawings show a riding type lawn mower having passages for engine cooling air formed in accordance with the present invention, in which.

DETAILED DESCRIPTION OF THE PREFERRED EMBODIMENTS

Figure 1:
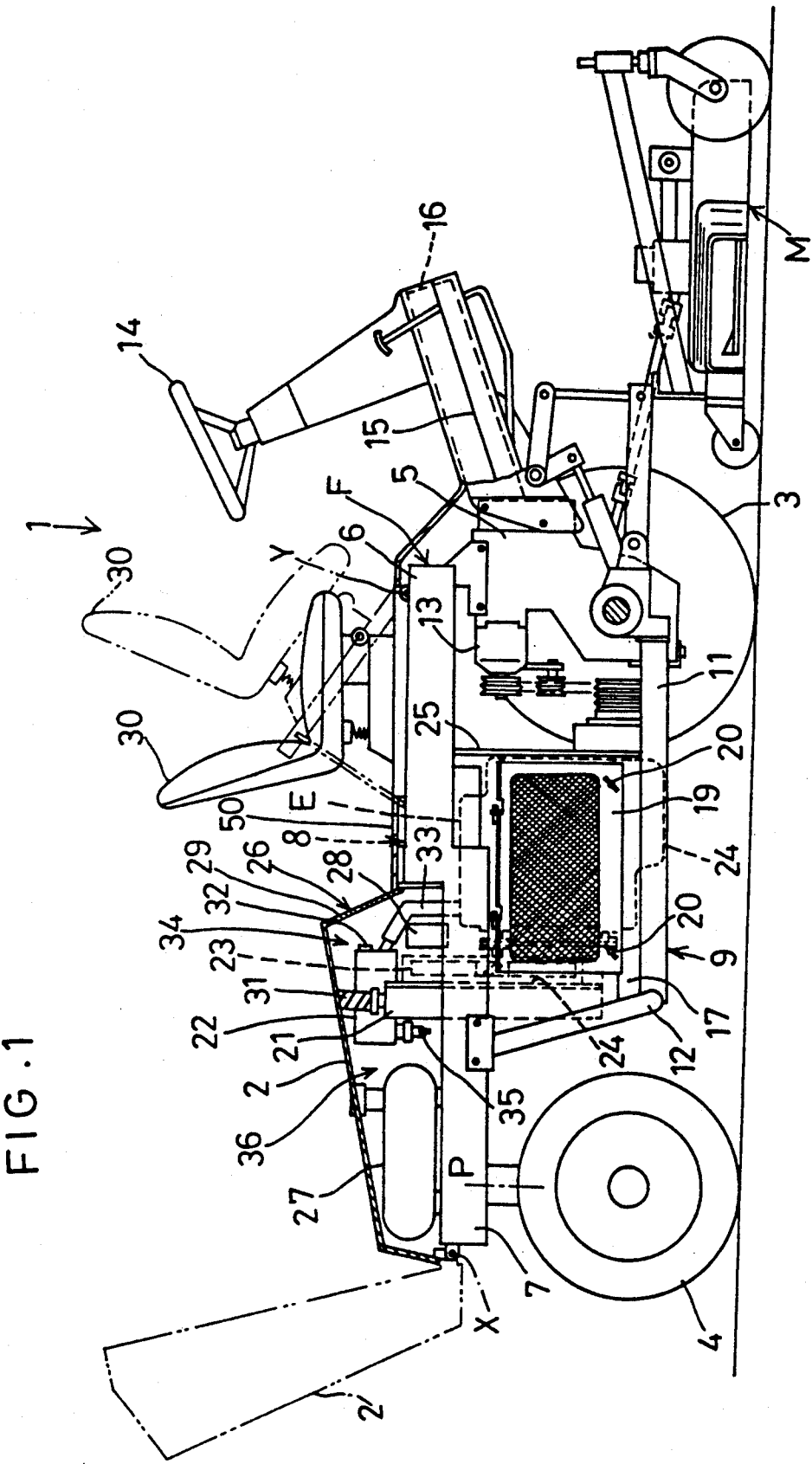
FIG. 1 is a side elevation of the lawn mower.

FIG. 1 shows a riding type lawn mower having a mower or grass cutting unit M vertically movably connected to the front thereof. The lawn mower includes a driver's section 1 in a front position, and a rear hood 2 in a rear position thereof. This mower runs on front drive wheels 3 and rear steerable wheels 4.

The front wheels 3 are journaled in a transmission case 5 fixed to a front end portion of a body framework F. The rear wheels 4 are connected to a rear end portion of the body framework F to be steerable about a vertical axis P.

Figure 2:
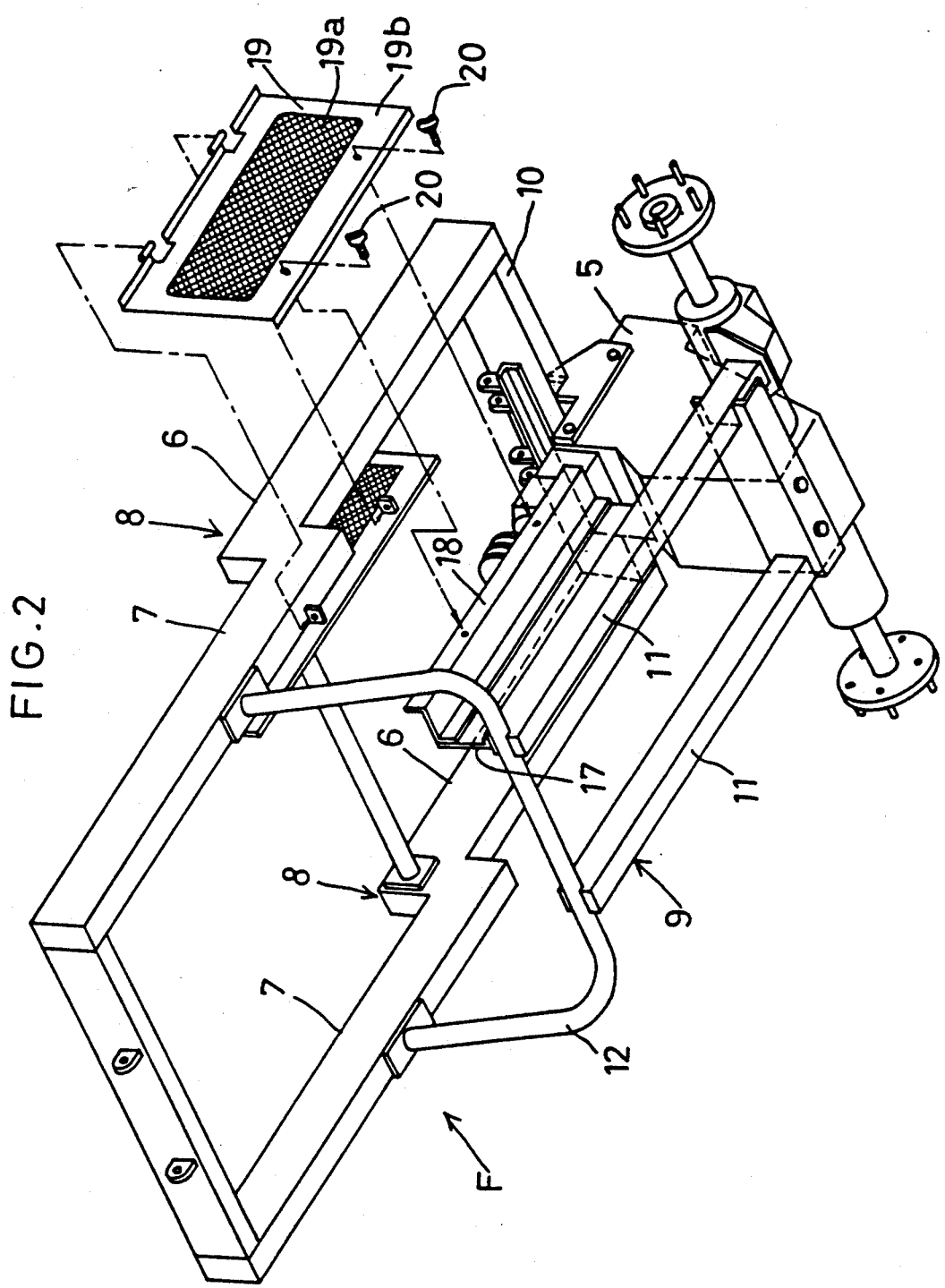
FIG. 2 is a perspective view of a body frame.

As also shown in FIG. 2, the body framework F includes right and left main frames 8 and a lower frame assembly 9. Each main frame 8 consists of a front frame 6 and a rear frame 7 which are vertically stepped. The main frames 8 are interconnected at forward ends thereof by a front cross frame 10. The transmission case 5 is bolted to and suspended from the front cross frame 10. The lower frame assembly 9 includes right and left support frames 11 having forward ends thereof bolted to lower positions of the transmission case 5. The support frames 11 are connected at rear ends thereof to a pipe frame 12, which is U-shaped in front view, bolted to the rear frames 7.

An engine E is supported by the lower frame assembly 9 including the support frames 11 and pipe frame 12. The engine E has a cooling fan 23 for exhausting cooling air rearwardly, and a radiator 21, and transmits power to an HST mounted in the transmission case 5.

The driver's section 1 includes a steering handle 14 and steps 15 supported on a floor fame 16 bolted to the transmission case 5.

The engine E is mounted on the support frames 11 through brackets 17 having lower cover members 18 fixed thereto. Side covers 19 are removably attached to the rear frames 7 and lower cover members 18. Specifically, the side covers 19 are connected to the rear frames 7 through pins and bores, and to the lower cover members 18 by means of wing bolts 20. Each side cover 19 includes a dust protective net 19a formed of a screen or expanded metal and fixed to a frame 19b for allowing passage of incoming cooling air. The right and left side covers 19 are interconnected at forward ends thereof by a front cover 25, and connected at rear ends to a fan frame 24 surrounding the cooling fan 23. Thus, the fan 23 has its suction side substantially closed, with only the dust protective nets 19a allowing influx of ambient air.

Numeral 50 in FIG. 1 denotes a top plate extending between the front frames 6, which acts also as an upper shield of a cooling air passage in an engine region.

Figure 3:
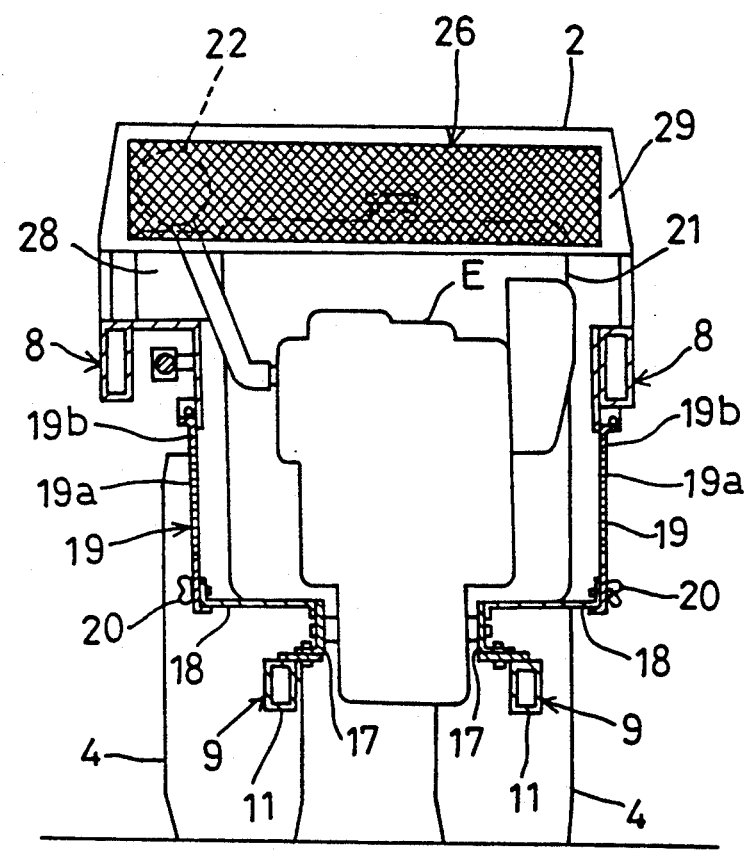
FIG. 3 is a sectional front view of an engine mounting structure.

The rear hood 2 and adjacent components will be described next with reference to FIGS. 1 and 3. The rear hood 2 is provided rearwardly of the driver's section 1 to cover an area over the radiator 21. The rear hood 2 also defines an ambient air intake 26 in a front portion thereof for allowing ambient air to flow to the fan 23.

Specifically, the rear hood 2 is pivotable on a rear transverse axis X between an open position and a closed position. In the closed position, the rear hood 2 covers an upper portion of the radiator 21 projecting above the rear frames 7, a fuel tank disposed rearwardly thereof, and an oil cooler 28 erected in front of the upper portion of the radiator 21 to cool hydraulic oil for operating the HST 13. The hood 2 has a front wall 29 formed of a dust protective net for drawing ambient air from a space behind a driver's seat 30.

The front wall 29 of the hood 2 is in an environment relatively free of grass clippings and dust. The dust protective net forming the front wall 29 may, therefore, have a larger or coarser mesh than the dust protective nets 19a surrounding the engine E.

The driver's seat 30 is pivotable on a forward transverse axis Y.

A partition wall 31 is disposed on the radiator 21 for dividing, longitudinally of the lawn mower, an interior space of the rear hood 2 in the closed position. The partition wall 31 supports an air cleaner 22 extending therethrough longitudinally of the lawn mower.

The air cleaner 22 has an inlet 32 and an outlet 33, the latter extending to the engine E, disposed in a front chamber 34, and a waste discharge port 35 disposed in a rear chamber 36.

Figure 4:
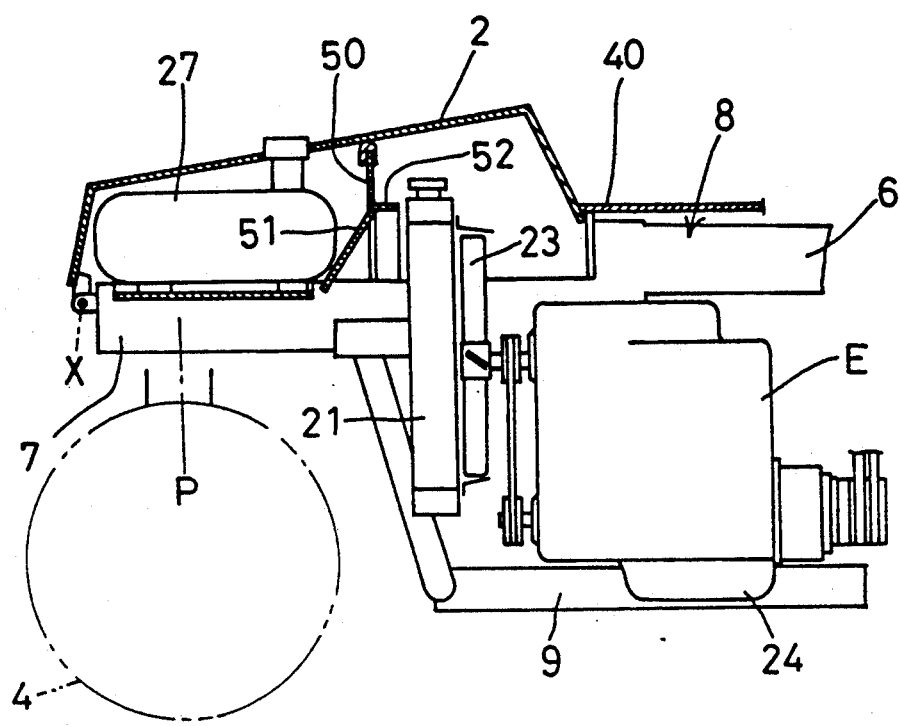
FIG. 4 is a sectional side view of a shield mounted in a rear position of the lawn mower, showing modified cooling air passages.
Figure 5:
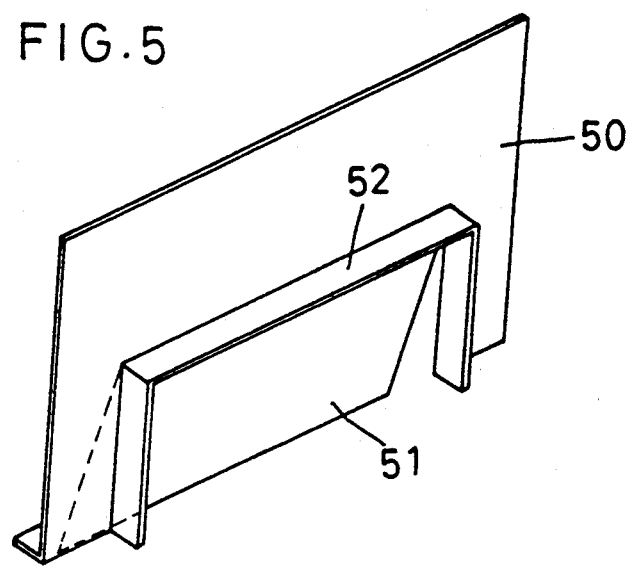
FIG. 5 is a perspective view of the shield shown in FIG. 4.

FIGS. 4 and 5 show a modified cooling air passage defined rearwardly of the radiator 21. This construction includes a shield 50 erected between the radiator 21 and fuel tank 27 in a shape following an inside surface of the rear hood 2.

As shown in FIG. 5, a lower intermediate portion of the shield 50 is bent rearwardly to define a guide portion 51, and an inverted U-shaped guide plate 52 is attached to a front face of the shield 50. Consequently, exhaust cooling air blown by the fan 23 is directed by the guide portion 51 to flow downwardly of the tank 27 and rearwardly of the lawn mower.

This construction prevents the relatively hot cooling air from reaching the fuel tank 27. Although the tank 27 is disposed in a low position, an inadvertent increase in the tank temperature is avoided.

What is claimed is:

1. A lawn mower having a driver's section and a grass cutting unit forwardly of a vehicle body, and an engine mounted between front and rear wheels, comprising;
   a pair of main frames extending longitudinally of the vehicle body, each of said main frames including a front frame member, and a rear frame member connected to said front frame member and disposed at a lower level than said front frame member,
   said engine being mounted below the front frames between said front and rear wheels,
   a radiator disposed rearwardly of said engine and having an upper portion projecting upwardly of the rear frame members,
   first cover means for covering said engine, said first cover means including side covers depending respectively from said main frames, lower covers connecting the respective side covers to lower positions of said engine, and a front cover for closing an area forwardly of said engine, said radiator defining a rear wall of said first cover means,
   second cover means disposed rearwardly of said driver's section for covering said upper portion of said radiator, said second cover means defining a second ambient air intake opening in a forward portion thereof, and
   a fan disposed adjacent said radiator, cooling air flows produced by said fan being drawn through said first and second ambient air intake openings, at least a large part of said cooling air flows being exhausted rearwardly through said radiator.

2. A lawn mower having a driver's section and a grass cutting unit forwardly of a vehicle body, and an engine mounted between front and rear wheels, comprising:
   a radiator disposed rearwardly of said engine,
   first cover means for covering said engine, and defining first ambient air intake openings,
   second cover means disposed rearwardly of said driver's section for covering a region upwardly of said radiator, said second cover means defining a second ambient air intake opening in a forward portion thereof,
   a fan disposed adjacent said radiator, cooling air flows produced by said fan being drawn through said first and second ambient air intake openings, at least a large part of said cooling air flows being exhausted rearwardly through said radiator, and
   a pair of main frames extending longitudinally of the vehicle body, wherein said first cover means includes side covers depending respectively from said main frames extending longitudinally of the vehicle body, lower covers connecting the respective side covers to lower positions of said engine, and a front cover for closing an area forwardly of said engine.

3. A lawn mower as claimed in claim 2, wherein said radiator defines a rear wall of said first cover means.

4. A lawn mower as claimed in claim 3, wherein said first ambient air intake openings are defined in said side covers.

5. A lawn mower as claimed in claim 2, wherein said radiator projects upwardly of said main frames, and said second cover means is pivotably connected to said main frames.

6. A lawn mower as claimed in claim 5, wherein said second ambient air intake opening is defined in a front wall of said second cover means.

7. A lawn mower as claimed in claim 5, wherein said second cover means contains an oil cooler disposed forwardly of said radiator.

8. A lawn mower as claimed in claim 5, further comprising a partition wall extending between a lower face of said second cover means and an upper face of said radiator.

9. A lawn mower as claimed in claim 5, further comprising a shield disposed rearwardly of said radiator and extending between a lower face of said second cover means and said main frames, and a fuel tank disposed inside said second cover means and rearwardly of said shield.

10. A lawn mower as claimed in claim 2, wherein said first and second ambient air intake openings have mesh members, respectively, the mesh members of said second ambient air intake openings having a larger mesh than the mesh member of said first ambient air intake opening.

* * * * *